United States Patent [19]

Hepp

[11] Patent Number: 4,842,114
[45] Date of Patent: Jun. 27, 1989

[54] AIR CLUTCH WITH TOOL CHANGER
[75] Inventor: Ludwig K. Hepp, Oshawa, Canada
[73] Assignee: GM of Canada Limited, Oshawa, Canada
[21] Appl. No.: 150,117
[22] Filed: Jan. 29, 1988
[51] Int. Cl.⁴ .................... B25J 19/00; F16D 43/286
[52] U.S. Cl. .................. 192/56 F; 192/150; 901/49
[58] Field of Search ............... 192/56 F, 150, DIG. 1; 901/49

[56] References Cited
U.S. PATENT DOCUMENTS

| | | | |
|---|---|---|---|
| 3,442,362 | 5/1969 | Bangerter | 192/150 |
| 4,540,331 | 9/1985 | Stanner et al. | 901/49 |
| 4,717,003 | 1/1988 | McCormick et al. | 192/56 F |

FOREIGN PATENT DOCUMENTS 0216892  1/1985  Fed. Rep. of Germany ........ 901/49

Primary Examiner—Leslie A. Braun
Assistant Examiner—Andrea Pitts
Attorney, Agent, or Firm—Ernest E. Helms

[57] ABSTRACT

The present invention provides and apparatus and method of utilization thereof of an air clutch for a robot or like having simple rugged construction. A preferred embodiment of the present invention provides an air clutch for a robot which does not require a bladder and has a quick connection type coupling action allowing for rapid changeover of various end of arm tools (EOAT) for the robot or like.

11 Claims, 3 Drawing Sheets 4,842,114

1

AIR CLUTCH WITH TOOL CHANGER

THE FIELD OF THE PRESENT INVENTION

Field of the present invention is that of clutches for connecting a robot or like with an end of arm tool (EOAT). Additionally the field of the present invention is that of air or pneumatic type clutches which are in addition quick connect type devices.

DISCLOSURE STATEMENT

To protect a robot or like and its associated end of arm tooling (EOAT) from excessive loading upon the tooling it is common to provide a clutch or cutout device. The clutch is placed between the robot or like and the attached EOAT. The clutch provides compliance to prevent damage. The clutch often contains a sensor to signal to the robot or like when some type of deformation in the clutch has occurred and that the robot or like should cease operation. An example of such a device is shown in Stanner et al, U.S. Pat. No. 4,540,331 commonly assigned. The present invention provides a pneumatic clutch which is an alternative to Stanner.

SUMMARY OF THE INVENTION

The present invention provides a pneumatic clutch and in a preferred embodiment does not require the use of a bladder. In the preferred embodiment, the present invention has a shell with a cylindrical inner chamber which is selectively chargeable and is connected with a robot or like. Slidably and sealably mounted within the shell is a piston having a surface opposite the robot which is nonplanar. The shell also has on an end opposite the robot or like an inward facing flange. Captured between the inward facing flange and the piston is a connector plate. The connector plate has a first section which is connected to the associated EOAT and an enlarged section captured within the shell between the flanged end of the shell and the piston. The connector plate also has a nonplanar surface in mesh with the piston. The piston, responsive to the fluid pressure within the chamber, normally holds the connector plate in a fixed position. However, a loading force of a predetermined magnitude upon the EOAT causes the connector plate to force the piston to move signaling the robot or like to cease operations. Additionally the shell has a radial slot along its flanged end allowing the connector plate to be removed upon the movement of the piston towards the robot or like.

It is an object of the present invention to provide a fluid charged clutch to connect a robot or like with an EOAT and to provide a method of utilization thereof. Additionally, it is an object of the present invention to provide a quick connect device for connecting an EOAT with a robot or like.

It is an object of the present invention to provide a clutch adapted for connection between a robot or like and an attached EOAT for deformation upon an applied load on the EOAT beyond a predetermined amount, the clutch including a shell for connection with the robot or like, the shell having a generally cylindrical inner chamber with an inward facing flange at an end generally opposite the robot or like, a rigid piston slidably and sealably mounted within the inner chamber responsive to the fluid pressure within the inner chamber, the piston on a surface opposite the robot or like having a nonplanar surface, a connector plate having a first section for connection with the EOAT and a second enlarged section captured within the shell between the flanged end and the piston, the connector plate having a nonplanar surface generally in mesh with the piston whereby the connector plate is held in position by the piston and a load of a predetermined amount on the EOAT causes movement of the connector plate and the piston within the shell.

It is an object of the present invention to provide a quick connector pneumatic bladderless clutch adapted for connection between a robot or like and an attached EOAT for deformation upon an applied load on the EOAT beyond a predetermined amount, the clutch including a shell for connection with the robot or like, the shell having a generally cylindrical inner chamber connected by a fluid line for selective charging or vacuuming, and the shell having an end plate and the shell having along the end of the shell opposite the robot or like, a generally radial slot, a rigid piston slidably, sealably, and nonrotatively mounted within the shell inner chamber responsive to fluid pressure within the chamber, the piston having on a surface opposite the robot or like a nonplanar surface, and a connector plate having a first section for connection with the EOAT and a neck fitting within the radial slot of shell and a second enlarged section which may be captured within the shell between the shell end plate and the piston, the connector plate having a nonplanar surface in mesh with the piston and held within the shell in a fixed position by the piston whereby an applied load of a predetermined amount on the EOAT causes movement of the connector plate and the piston within the shell and whereby the connector plate can be released from the shell by releasing the charge of the fluid within the interior chamber allowing the piston to move toward the robot or like and then moving the connector plate through the radial slot of the shell.

It is an object of the present invention to provide a method of connecting an EOAT with a robot or like allowing deformation upon an applied load on the EOAT beyond a predetermined amount, the method including connecting with the robot or like a shell having a generally cylindrical inner chamber with an inward facing flanged end opposite the robot or like, slidably and sealably mounting within the inner chamber a piston having a nonplanar surface generally opposite the robot or like, connecting the EOAT with a first section of a connector plate, and capturing within the shell between the piston and the flanged end of the shell an enlarged section of the connector plate having a nonplanar surface generally in mesh with the piston whereby the connector plate is held in a fixed position by the piston and an implied load of a predetermined amount on the EOAT causes movement of the connector plate and the piston within the shell and disconnecting the EOAT from the robot or like by connecting the interior chamber with a vacuum source, moving the piston toward the robot or like, and laterally displacing the connector plate through a radial slot in the shell.

Other objects, desires and advantages of the present invention can become more apparent to those skilled in the art as the nature of the invention is better understood in the accompanying drawings and a detailed description.

DETAILED DESCRIPTION OF THE DRAWINGS

Figures 1, 2:
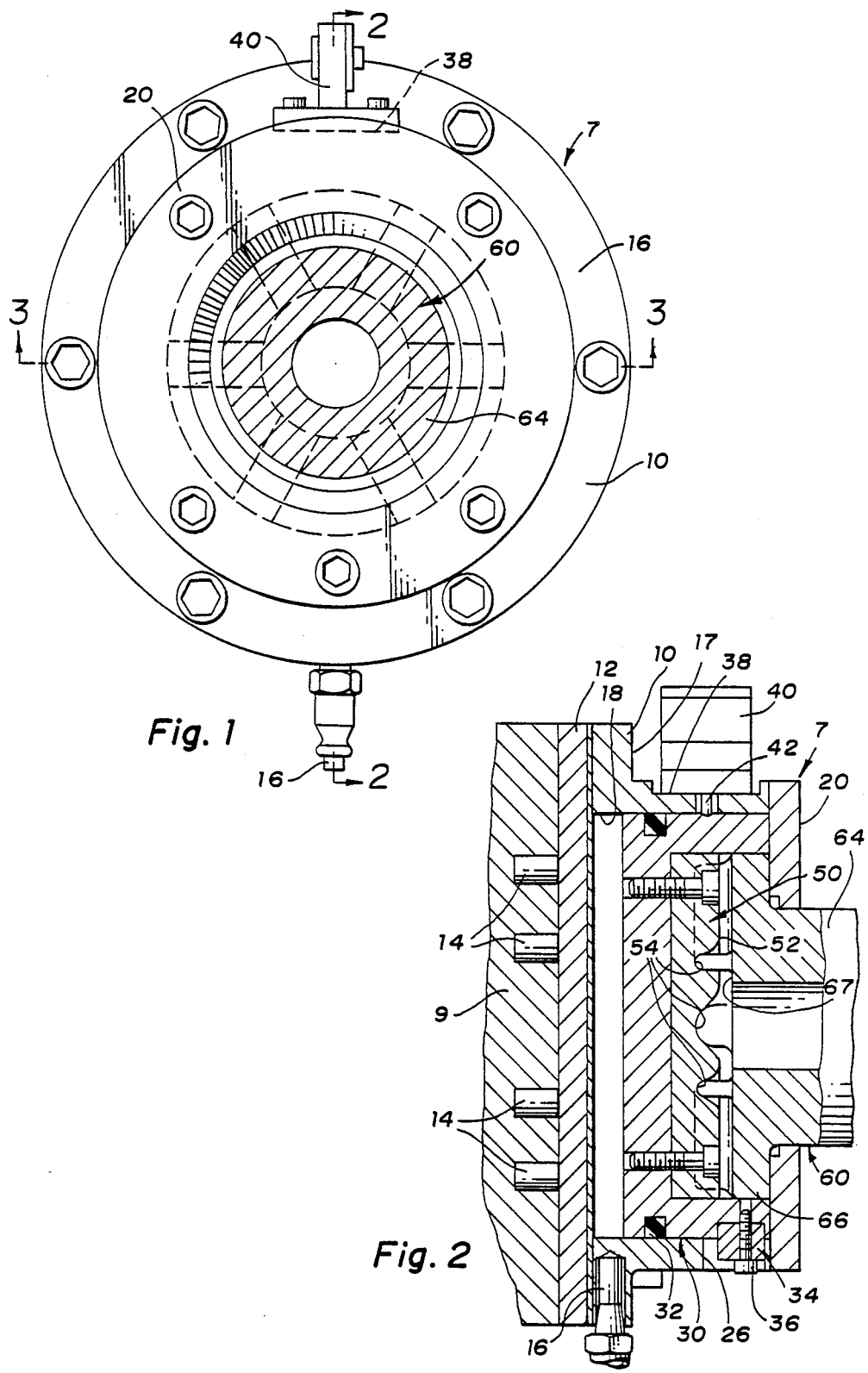
FIG. 1 is a sectional view mainly shown in top plan of a preferred embodiment of the present invention.
FIG. 2 is a view taken along line 2—2 of FIG. 1.
Figure 3:
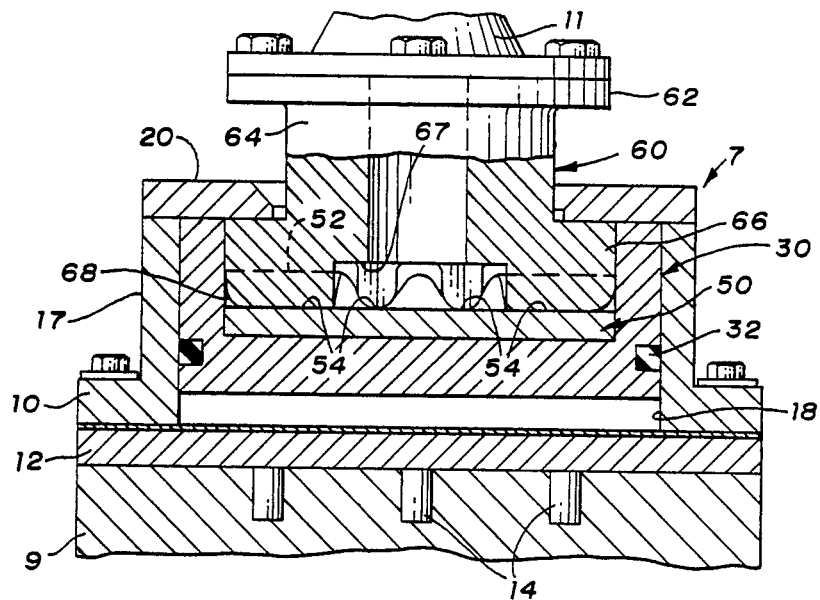
FIG. 3 is a view taken along line 3—3 of FIG. 1.
Figure 4:
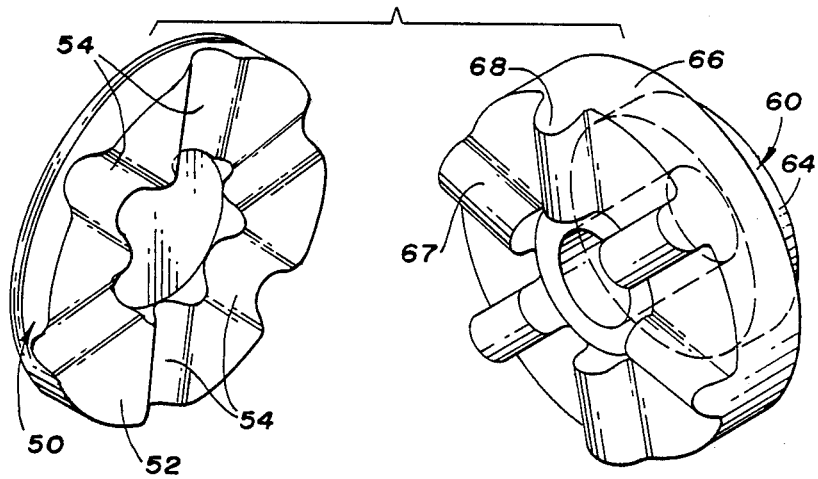
FIG. 4 is a perspective view illustrating the nonplanar surfaces of a pressure plate and a connector plate.

Referring to FIGS. 1, 2, 3 and 4, the clutch 7 quick connect device of the present invention is connected between an EOAT 11 and a robot or like 9. The clutch 7 has a shell 10. The shell 10 has a rear mounting plate 12 with alignment pins 14 for connection with the robot 9 or like by a series of bolts or other means. Boltably connected to the mounting plate is the shell exterior side 17.

The shell 10 has a line 16 connected with a fluid or pneumatic source (not shown) to provide the means to selectively charge a generally cylindrical interior chamber 18 of the shell 10 from the exterior. Line 16 is also used to expose the interior 18 of the shell 10 to a vacuum.

Boltably connected to the side shell 17 and providing a generally inward facing flange at an end of the shell 10 generally opposite the robot 9 is an end plate 20.

Slidably and sealably mounted within the shell interior chamber 18 is a generally rigid piston 30. The piston has a seal ring 32 along its side edge to seal with the shell interior chamber 18. The piston 30 moves in response to the air pressure within the shell interior chamber 18. The piston 30 has connected thereto a key 34 connected by a cap screw 36. The key 34 is constrained within the aperture 26 of the shell side 17. The piston 30 is therefore restrained in its motion away from or towards the robot 9. Key 34 also provides the means to constrain rotation of the piston 30.

The piston 30 has a dimpled end 38 allowing for placement of a switching means or cut out device 40. Inserted and nested within the piston and connected thereto by a series of bolts is a pressure plate 50. The pressure plate has a nonplanar surface 52 facing opposite robot 9. Nonplanar surface 52 provides a series of geometrically radially spaced and projecting valleys 54 of a predetermined surface profile which is nonplanar.

A connector plate 60 is provided having a flanged first section 62 for connection with the desired EOAT 11. Connected with the flanged first section 62 is a first section neck 64. The connector plate 60 also has a second enlarged section 66 with slightly rounded edges 68. Second section 66 is captured within the shell 10 between the end plate 20 and the piston 30. The connector plate 60 has on a surface towards the robot 9 a nonplanar surface 67 which is self aligning and in mesh with the surface 52 of the pressure plate 50.

In operation, interior chamber 18 is pressurized. Piston 30 will then hold the connector plate 60 in position against the end plate 20. Since the piston 30 cannot rotate, excessive torsional forces upon the EOAT 11 will cause the connector plate 60 to rotate and cause the piston 30 to be pushed towards the robot 9. Also, an excessive compressive force on the EOAT 11 will cause the connector plate 60 to move piston 30. As will be apparent to those skilled in the art an excessive moment force on EOAT can also cause deformation in the preset position of piston 30.

The desired force required to cause movement of piston 30 can be changed in at least two separate manners. The force can be changed by modifying the air pressure within the interior chamber 18. The desired force can also be changed by utilizing different pressure plate and connector plate surface profiles with different cam angle.

Alignment of the piston 30 with the interior shell chamber 18 is totally assured by the relatively large cylindrical surface of the piston 30 which mates with the shell interior chamber 18. Due to the use of the seal ring 32, a bladder is not required. Since the piston 30 can only move linearly within the interior shell chamber 18, the torsional forces which can be imposed upon EOAT 11 can be set to be fairly great before the connector plate 60 will move the piston 30. Upon movement of the piston 30 a probe 42 will activate the switch 40 to signal the robot 9 that an undesirable condition has occurred and to cease operations.

A check valve (not shown) can be placed in the line 16 or in the air line leading to the line 16 to maintain the pressure in the shell interior chamber 18 in cases of pneumatic system failure.

Figure 5:
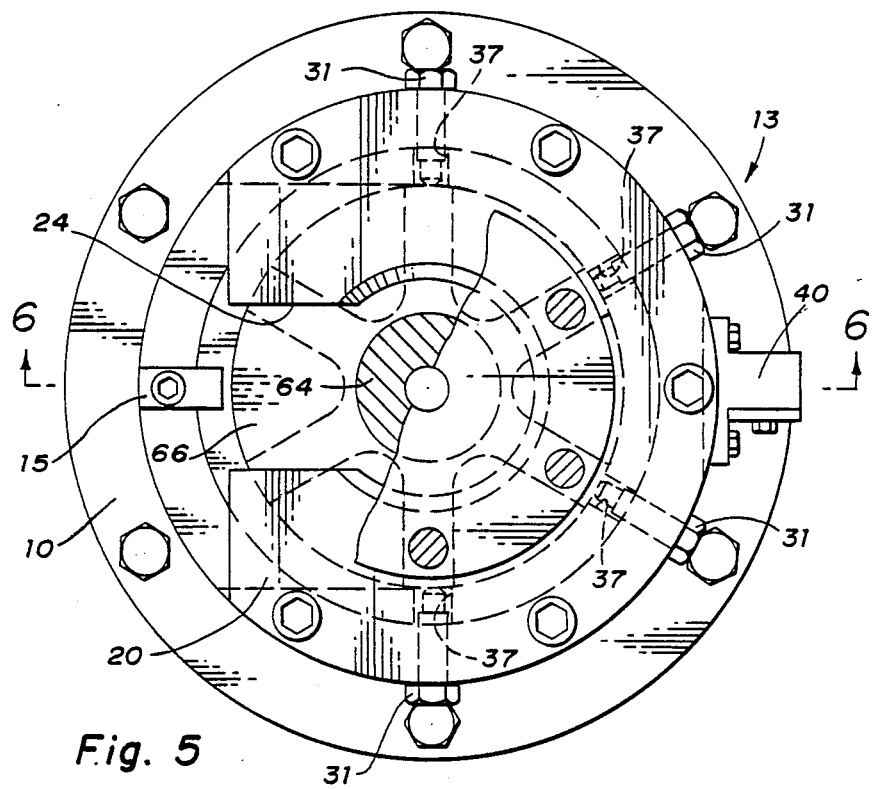
FIG. 5 is a sectional view mainly shown in top plan of an alternative embodiment on the present invention to that shown in FIG. 1.
Figure 6:
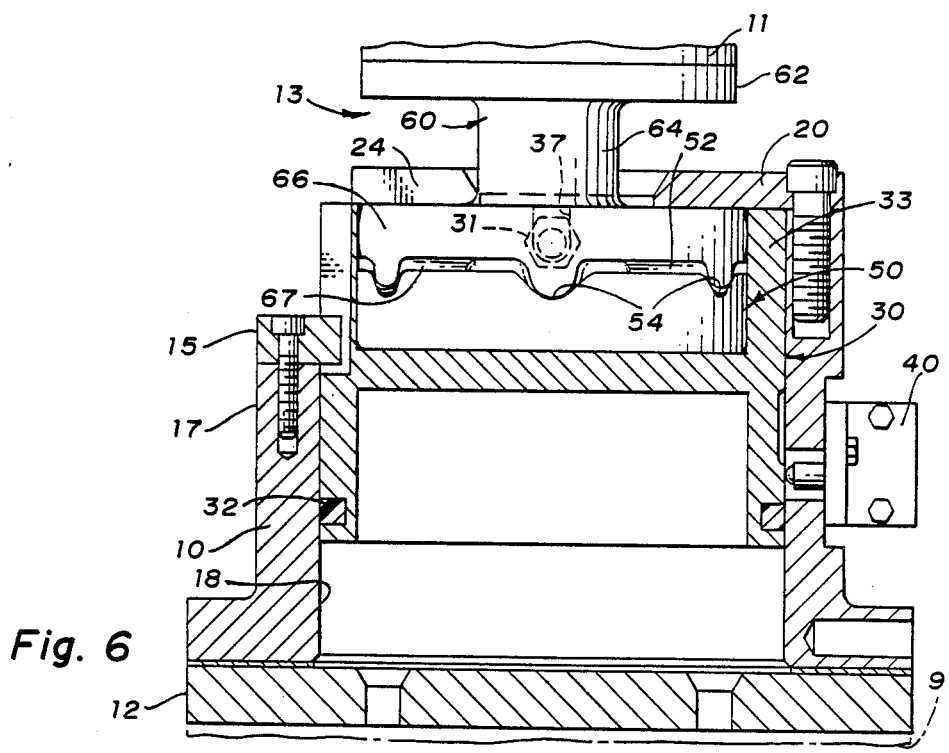
FIG. 6 is a view taken along line 6—6 of FIG. 5.

Referring additionally to FIGS. 5 and 6 an alternate preferred embodiment clutch 13 is provided with similar component given like reference numerals. The clutch 13 also functions as a quick connect device.

The end plate 20 and the shell side 17 towards the end of the shell opposite the robot 9 has a radial slot opening 24. A tab 15 is fitted within a key way of the piston 30 to prevent rotation of the piston 30.

In operation, the interior chamber 18 is connected with a vacuum source. The piston 30 will move towards the robot 9. On a tool presentation table (not shown) the connector plate 60 is fixably connected with the desired EOAT 11. The robot 9 then positions the shell 10 adjacent to the connector plate 60 near the radial slot opening 24 of the end plate 20 and the shell exterior side 17. The robot 9 will then move the shell 10 over thereby inserting the connector plate 60 within the shell 10.

The shell side 17 has four geometrically spaced apertures. Threaded within the apertures are alignment screws 31. The alignment screws 31 insure proper placement of the second enlarged section 66 within interior chamber 18 since there is a significant clearance between the inner chamber 18 and the second enlarged section 66.

The shell interior chamber 18 is then pressurized to a desired pressure and the piston 30 moves away from robot 9 and capture the connector plate second section 66 against end plate 20. The piston upper portion 33 has notches 37 aligned with the apertures of the side shell 17 so that the piston 30 can then come up to contact the end plate 20 and surround the second enlarged section 66. Since the nonplanar surfaces 67 and 52 of the connector plate 60 and the pressure plate 50 are self aligning, connector plate 60 will slightly rotate until it is properly aligned and thereafter the connector plate 60 will be locked in position. The robot 9 can then function on a workpiece as desired.

When the desired operation on the work piece is completed, the robot 9 will position the connector plate 60 and EOAT 11 back into a fixture (not shown) on the tool presentation table. The piston 30 is retracted by a vacuum and the robot 9 will slide the shell 10 over allowing the connector plate 60 to be laterally displaced through the radial opening 24 of the shell and end plate. The robot 9 is now prepared for picking up the next connector plate with the next EOAT desired. It will be obvious to those skilled in the art that the shell 10 may be held stationary and a fixture may move the connector plate 60 and the attached EOAT 11 in and out of the shell 10 of desired.

The present invention provides a method of connecting an EOAT 11 with a robot 9 or like allowing deformation upon an applied load on said EOAT 11 beyond a predetermined amount, the method including the following steps:

1. Connecting with said robot 9 or like a shell 10 having a generally cylindrical inner chamber 18 with an inward flange end 20 opposite said robot or like;
2. Slidably and sealably mounting within the inner chamber a piston 30 having a nonplanar surface 52 generally opposite said robot 9;
3. Connecting said EOAT 11 with a first 62 section of the connector plate 60 and capturing within the shell 10 between the piston 30 and the flange end 20 an enlarged section 66 of the connector plate having a nonplanar surface 67 generally in mesh with the piston 30 whereby the connector plate 60 is held in a fixed position by the piston 30 and an implied load of a predetermined amount on the EOAT 11 causes movement of the connector plate 60 and the piston 30 with the shell.

While a few of the embodiments of the present invention has been explained it will be readily apparent to those skilled in the art of the various modifications which can be made to present invention without departing from the spirit and scope of this application as it is encompassed by the following claims.

The embodiments of the invention in which an exclusive property or privilege is claimed are defined as follows:

1. A clutch adapted for connection between a robot or like and an attached EOAT for deformation upon an applied load on said EOAT beyond a predetermined amount, said clutch in combination comprising:
   a shell for connection with said robot or like, said shell having a generally cylindrical inner chamber with a generally inward facing flange at an end generally opposite said robot or like;
   a rigid piston slidably and sealably mounted within said inner chamber responsive to the fluid pressure within said inner chamber, said piston on a surface opposite said robot or like having a nonplanar surface;
   a connector plate having a first section for connection with said EOAT and a second enlarged section captured within said shell between said flanged end and said piston, said connector plate having a nonplanar surface generally in mesh with said piston whereby said connector plate is held in position by said piston and a load of a predetermined amount on said EOAT causes movement of said connector plate and said piston within said shell.

2. A clutch as described in claim 1 further including means to restrain said piston from rotation relative to said shell.

3. A clutch as described in claim 1 further including means to selectively charge fluid from the exterior of said shell to said inner chamber.

4. A clutch as described in claim 1 further including switch means to provide a signal upon movement of said piston to signal said robot or like to cease operations.

5. A clutch as described in claim 1 further including a fixably connected pressure plate insert connected with said piston for providing said nonplanar surface.

6. A clutch as described in claim 1 wherein said nonplanar surface of said connector plate meshes with said piston in a self-aligning manner.

7. A clutch as described in claim 1 wherein said shell has means to selectively charge or remove fluid from said shell and said shell having a radial slot in said flanged end of said shell opposite said robot or like whereby said piston may be moved toward said robot or like by connecting said inner chamber with a vacuum and said connector plate may be removed by sliding sideways from said shell through said shell slot.

8. A bladderless clutch adapted for connection between a robot or like and an attached EOAT for deformation upon an applied load on said EOAT beyond a predetermined amount, said clutch in combination comprising:
   a shell for connection with said robot or like, said shell having a generally cylindrical inner chamber which can be selectively charged from the exterior of said shell, said shell also having an inward facing flanged end generally opposite said robot or like;
   a rigid piston slidably, sealably and nonrotatively mounted within said shell inner chamber;
   a pressure plate fixably connected with said piston having a nonplanar surface generally opposite said robot;
   a cutoff switch for detecting movement of said piston and providing a signal to said robot or like in response to movement of said piston; and
   a connector plate having a first section for connection with said EOAT and a second enlarged section captured within said shell between said flanged end and said piston, said connector plate having a nonplanar surface generally in mesh with said piston whereby said connector plate is held in a fixed position by said piston and a load of a predetermined amount on said EOAT causes movement of said connector plate and said piston within said shell causing said switch to detect movement of said piston and to signal said robot or like to cease operations.

9. A quick connector pneumatic bladderless clutch adapted for connection between a robot or like and an attached EOAT for deformation upon an applied load on said EOAT beyond a predetermined amount, said clutch in combination comprising:
   a shell for connection with said robot or like, said shell having a generally cylindrical inner chamber connected by a fluid line for selective charging or vacuuming, and said shell having an end plate and said shell having along said end of said shell opposite said robot or like a generally radial slot;
   a rigid piston slidably, sealably, and nonrotatively mounted within said shell inner chamber responsive to fluid pressure within said chamber, said piston on a surface opposite said robot or like having a nonplanar surface; and
   a connector plate having a first section for connection with said EOAT, and a neck fitting within said radial slot of shell, and a second enlarged section which may be captured within said shell between said shell end plate and said piston, said connector plate having a nonplanar surface in mesh with said piston and held within said shell in a fixed position by said piston whereby an applied load of a predetermined amount on said EOAT causes movement of said connector plate and said piston within said shell and whereby said connector plate can be released from said shell by releasing the charge of said fluid within said interior chamber allowing said piston to move toward said robot or like and then moving said connector plate through said radial slot of said shell.

10. A method of connecting an EOAT with a robot or like allowing deformation upon an applied load on said EOAT beyond a predetermined amount, said method in combination comprising:

connecting with said robot or like a shell having a generally cylindrical inner chamber with an inward flanged end opposite said robot or like;

slidably and sealably mounting within said inner chamber a piston having a nonplanar surface generally opposite said robot or like;

connecting said EOAT with a first section of a connector plate and capturing within said shell between said piston and said flanged end an enlarged section of said connector plate having a nonplanar surface; and meshing said connector plate nonplanar surface with said piston whereby said connector plate is held in a fixed position by said piston and an implied load of a predetermined amount on said EOAT causes movement of said connector plate and said piston within said shell.

11. A method as described in claim 10 further including disconnecting said EOAT from said robot or like by connecting said interior chamber with a vacuum source;

moving said piston towards said robot; and laterally displacing said connector plate through a radial slot in said shell.

* * * * *